July 30, 1946.  E. SCHMACHT  2,404,926
EARTH EXCAVATOR
Filed Feb. 3, 1944  2 Sheets-Sheet 1
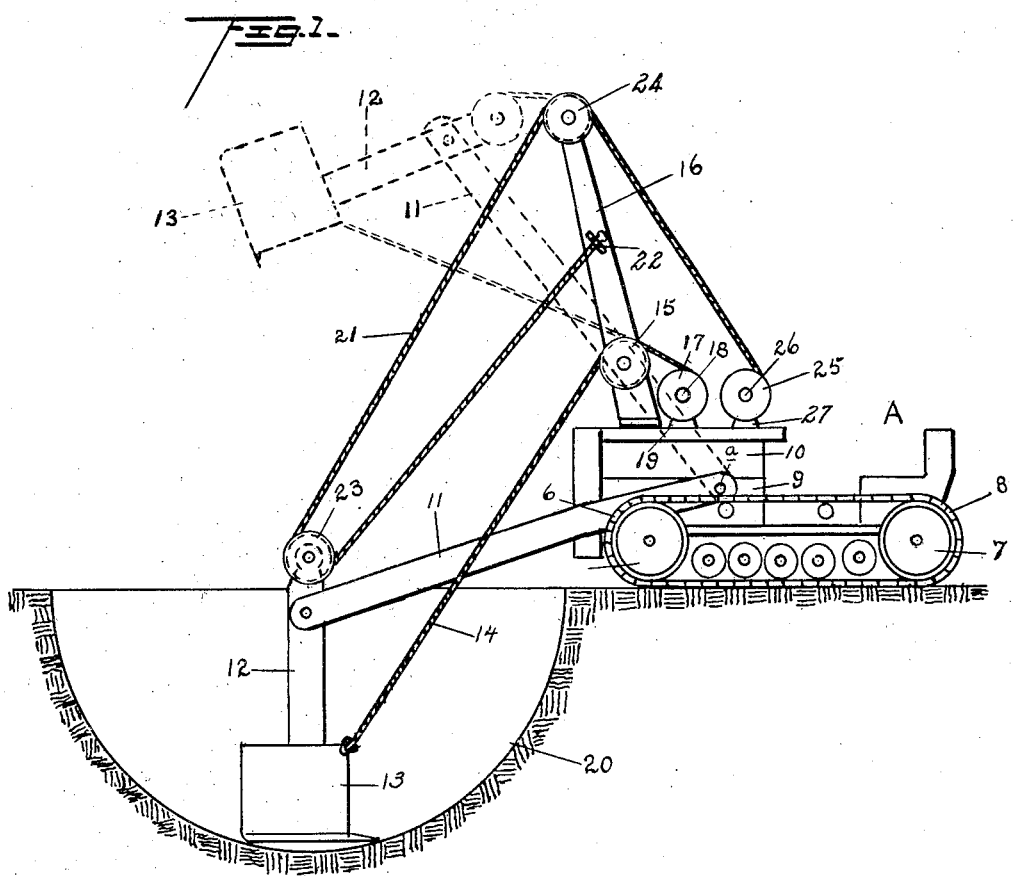
Inventor
Elmer Schmacht
By Walter N. Haskell,
his Attorney July 30, 1946.  E. SCHMACHT  2,404,926
EARTH EXCAVATOR
Filed Feb. 3, 1944  2 Sheets-Sheet 2
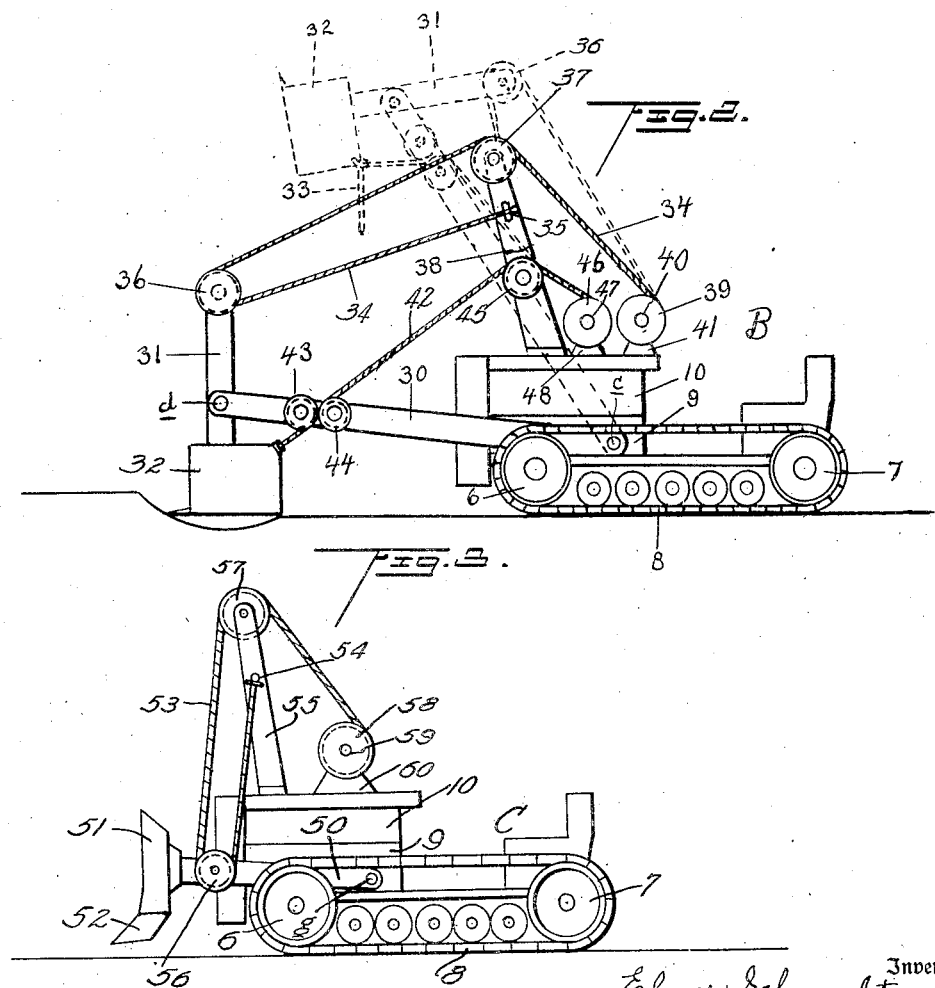
Inventor
Elmer Schmacht
By Walter N. Haskell.
his Attorney Patented July 30, 1946

2,404,926

UNITED STATES PATENT OFFICE 2,404,926

EARTH EXCAVATOR

Elmer Schmacht, Rock Island, Ill.

Application February 3, 1944, Serial No. 520,907

2 Claims. (Cl. 214—138)

My invention has reference to earth excavating machinery, such as is made use of in the handling of large quantities of earth, such as in the forming of ditches, excavations for buildings, and the like. The chief purpose of the invention is to increase the flexibility of movement and facility of operation of devices of the kind mentioned, which is accomplished by the application of certain earth handling mechanism to tractors capable of a rapid movement, such as those which are mounted on a pair of traction devices of an endless character, commonly known as caterpillar tractors. This type of tractor comprises one of the chief elements of the invention, upon which are based, and with which are combined, certain mechanical features including earth handling instrumentalities. These are independent of each other, and separately adaptable to use with the tractor mentioned, but interchangeable in their use therewith. The various mechanisms which can be thus adapted for use with the tractor, as pointed out herein, include a drag-shovel, or hoe, the movement of which is in the direction of the tractor, a regular scoop or shovel, the operation of which is away from the tractor, when being loaded, and a scraper or bull-dozer operating just ahead of the tractor.

In the present showing the mechanism containing the drag-shovel is more particularly stressed, as being of prime importance, and is associated with the tractor in such a way that material being excavated can be quickly scooped up and carried to a point within reasonable bounds, for dumping. This is on account of the facility of movement of the tractor itself, which is not limited to any particular spot near the place being excavated, but can be turned and moved in any direction. This would not be possible with some types of vehicle, in which the traction part is practically stationary, and the transfer of the load accomplished by means of a turn-table apparatus. Such a device is shown in United States Patent No. 1,785,492, issued to A. Orloff Dec. 16, 1930. In the machine shown therein the device is virtually perched on the edge of the opening, with no mobility such as would render it possible to convey the loads to a semi-distant point for discharge.

The above named, and other features and advantages of the invention will more fully appear from the following specification, reference being had to the accompanying drawings, in which.

Fig. 1 is a side elevation of one type of machine embodying the invention, as it appears when in use.

Fig. 2 is a similar view showing a different adaptation of mechanism.

Fig. 3 is a similar view in a still different arrangement of the device.

Similar numbers of reference indicate corresponding parts throughout the figures.

Fig. 1 discloses a mechanism which embraces in part a power tractor of common type, shown generally at A, and provided at each side with carrying wheels 6 and 7 united by endless traction belts 8. Said wheels are also provided with axles upon which is mounted a motor block 9, upon which is mounted a motor casing 10, containing mechanism for imparting movement to the tread devices, not shown herein. Pivoted at one of its ends to the side of the block 9 is a boom 11, with the other end of which is pivoted the handle 12 of a dipper or hoe 13, with its open or filling end toward the tractor. A cable 14 is connected at one end to the dipper 13, and passes upwardly over a sheave 15 rotatably supported on one side of a spar 16, mounted on the top of the casing 10, and thence to a drum 17 on a shaft 18 in a bearing 19 also supported on the top of the casing 10. The drum shaft is operatively connected with a motor in the casing 10, in a manner not shown herein, whereby the cable 14 can be wound or un-wound in the control of the dipper 13. The winding movement will be effective in swinging the dipper on its pivotal point making a circular cut in the earth as indicated at 20.

The dipper 13 can be raised by means of a cable 21, one end of which is anchored on the spar 16, as at 22, and which is then passed round a sheave 23 rotatably mounted on the upper end of the handle 10, and thence over a sheave 24 at the upper end of the spar 16 and downwardly to a connection with a drum 25 on a shaft 26, rotatably mounted in a bearing 27 on the deck of the casing 10. Upon the cable 21 being wound on the drum the handle and dipper are drawn upwardly, and the machine moved to the point where the load is to be discharged. A further movement of the drum will then cause the handle and dipper to upset, as shown in dotted lines, causing the discharge of the load by force of gravity. Upon the movement of the drum being reversed the dipper 11 and associated parts will be carried downwardly again of their own weight.

There is nothing specially novel about the arrangement and operation of the cables and drums in the several machines shown, except in their application and adaptation to the particular types of vehicle made use of. A tractor of the kind shown can be made to turn in its own length, and with the dipper and its load carried upwardly to the position shown in broken lines in Fig. 1, the vehicle can be run to any point where it is desired to dump the load, and the same upset, as indicated in said figure. The tractor can also be made to operate so as to form a road for itself in the rim of the excavation, permitting the boom and scoop to be carried downwardly to a greater extent than shown in the drawings. This cannot be done with a machine of the turntable type. By the use of the invention a considerable saving can be had in the time and labor required for a given amount of excavating.

In Fig. 2 is shown a style of the machine in which B represents a tractor of the caterpillar type, having parts corresponding to those of the tractor A, and with a boom 30 pivoted to the side of the block 9, as at c. Pivotally attached to the free end of the boom, as at d, is a handle 31, supporting a scoop 32, open at the side farthest from the tractor, and adapted to be filled with material by moving the same outwardly, either by swinging the handle at its pivotal point, or by movement of the tractor itself in a forward direction, or both. The dumping of the load is accomplished by the opening of a rear door or gate indicated in broken lines at 33. The scoop is raised or lowered by means of a cable 34 one end of which is anchored at 35 to a spar 38 mounted on the top of the motor casing. From thence the cable passes round a sheave 36 on the upper end of the handle 31, thence upwardly over a sheave 37 on the upper end of spar 38, and downwardly to a winding on a drum 39 on a shaft 40 rotating in bearings 41 on the tractor deck. When the cable 34 is wound on the drum it causes the boom 30 to swing upwardly, carrying with it the handle and scoop, until they are elevated to a position convenient for dropping the load. The handle and scoop are then upset, into the position shown in broken lines in Fig. 2, and the load released, as before mentioned. Before this is done the tractor is maneuvered to convey the load to a point where it is desired to have the same discharged.

The scoop is held normally from upsetting by means of a cable 42, connected at one end to the inner corner of the scoop 32, and passing between sheaves 43 and 44 on the beam 30, thence over a similar sheave 45 on the spar 38, and downwardly to a winding on a drum 46, on a shaft 47 rotatable in bearings 48 on the tractor top. Upon the scoop being fully elevated the cable 42 is slackened, permitting the scoop to upset.

In Fig. 3 is shown another adaptation of the apparatus in which C indicates a tractor with caterpillar tread, and other parts similar to those first described, and having like reference numbers. At the sides of the motor block are pivoted arms 50, as at e, united at their forward ends by a cross-beam 51, to which is attached a scraper 52, said parts comprising a bull-dozer structure. The cross-beam and scraper bar can be raised and lowered by means of a cable 53, anchored at one of its ends at 54 to a spar 55 projected upwardly from the deck of the motor casing, and passing round a sheave 56 on the arm 50, thence over a sheave 57 on the upper end of the spar 55 to a winding on a drum 58 on a shaft 59 supported rotatably on a bearing 60 on the tractor deck. Upon the cable being relaxed the weight of the bull-dozer beam operates to move the same downwardly for engagement with a quantity of earth ahead of the machine. The manner of transmitting the movement of the tractor motor to the drum 58 to rotate the same is not shown in the drawing, is the same as commonly employed in machines of this type.

The length of the booms and arms shown in the various structures may vary to suit the requirements, the arms 50 being considerably shorter than the booms employed in the other machines. Other changes in the structures may be made without departing from the spirit of the invention, as set forth herein.

What I claim and desire to secure, is—

1. In combination with a tractor supported on and driven by endless traction treads, for imparting a universal quick-turning ground action to the tractor, a motor casing mounted on said tractor, with a deck-like roof, a boom pivoted at one side of the tractor, projected forwardly therefrom, an earth moving apparatus supported from the free end of said boom, capable of being loaded when being moved away from the tractor, and exchangeable with similar apparatus capable of being loaded when moved toward the tractor, cable-winding mechanism supported on said deck, cable systems connecting said earth moving apparatus with said winding mechanism, for the proper handling of said apparatus, and a spar, projected upwardly from said deck, upon which the cable systems are operatively supported.

2. In combination with a power tractor supported by Caterpillar treads, imparting a universal quick-turning movement to the tractor, a motor casing mounted on said tractor, with a deck-like roof, cable winding mechanism mounted on said roof, an upwardly projecting spar fixed on said roof, for a cable support, a boom pivoted at the side of the tractor, an earth handling apparatus supported by the end of said boom, for operation when moving away from the tractor, and exchangeable with a similar apparatus for operation when moving toward the tractor, and interchangeable with a bull-dozer beam pivotally connected with the tractor, a cable system connecting the first-named earth handling apparatus with said winding mechanism, to raise and lower the same, and operatively supported on said spar, and a cable system connecting the earth handling apparatus with the winding mechanism, to cause the unloading thereof, and operatively connected with said spar.

ELMER SCHMACHT.